(12) United States Patent
Johnson et al.

(10) Patent No.: US 7,389,997 B2
(45) Date of Patent: Jun. 24, 2008

(54) WHEELED TRANSPORTING DEVICE WITH TELESCOPING LEG STABILIZATION ASSEMBLY

(76) Inventors: Kenneth R. Johnson, 5207 Lincolnshire Ct., Dallas, TX (US) 75287; Melissa A. Johnson, 5207 Lincolnshire Ct., Dallas, TX (US) 75287

( * ) Notice: Subject to any disclaimer, the term of this patent is extended or adjusted under 35 U.S.C. 154(b) by 0 days.

(21) Appl. No.: 11/825,720

(22) Filed: Jul. 9, 2007

(65) Prior Publication Data

US 2008/0012255 A1    Jan. 17, 2008

Related U.S. Application Data

(63) Continuation of application No. 10/986,239, filed on Nov. 11, 2004, now abandoned.

(60) Provisional application No. 60/626,703, filed on Nov. 10, 2004, provisional application No. 60/600,743, filed on Aug. 11, 2004, provisional application No. 60/519,169, filed on Nov. 11, 2003.

(51) Int. Cl.
*A47C 1/06* (2006.01)

(52) U.S. Cl. ............... 280/47.19; 280/47.24; 280/47.27; 280/47.29; 280/47.26; 280/47.25; 280/47.18; 280/47.28; 280/30; 280/638

(58) Field of Classification Search ............. 280/47.19, 280/47.24, 47.27, 47.29, 47.26, 47.25, 47.18, 280/30, 47.28, 638
See application file for complete search history.

(56) References Cited

U.S. PATENT DOCUMENTS

| | | | | | |
|---|---|---|---|---|---|
| 4,290,625 | A | * | 9/1981 | Barriere | 280/654 |
| 4,618,035 | A | * | 10/1986 | Mao | 190/18 A |
| 5,161,811 | A | * | 11/1992 | Cheng | 280/30 |
| 5,437,367 | A | * | 8/1995 | Martin | 206/320 |
| 5,507,508 | A | * | 4/1996 | Liang | 280/37 |
| 5,529,322 | A | * | 6/1996 | Barton | 280/30 |
| 5,695,246 | A | * | 12/1997 | Tsai | 297/335 |
| 5,941,352 | A | * | 8/1999 | Lee | 190/11 |
| 6,196,560 | B1 | * | 3/2001 | Ohlsson | 280/30 |
| 6,543,796 | B1 | * | 4/2003 | Johnson et al. | 280/47.18 |
| 6,736,073 | B2 | * | 5/2004 | Ryburg | 108/42 |

* cited by examiner

*Primary Examiner*—Christopher P. Ellis
*Assistant Examiner*—Cynthia F. Collado
(74) *Attorney, Agent, or Firm*—Winstead PC

(57) ABSTRACT

A combined desk and article carrier assembly for transporting at least one article in one mode and for serving as a work desk in another mode. The assembly includes wheels at its lower end with the upper end including an upwardly telescopical handle assembly for manually moving the frame on its wheels. A desk-top shelf is pivotally connected to an opposite side of the frame near its top end and is adapted to pivot outwardly and upwardly to a generally horizontal position to provide a support surface for supporting a lap top computer or the like. A telescoping support strut is attached to the desk-top shelf for providing additional support thereto in conjunction with a deployable foot.

9 Claims, 3 Drawing Sheets

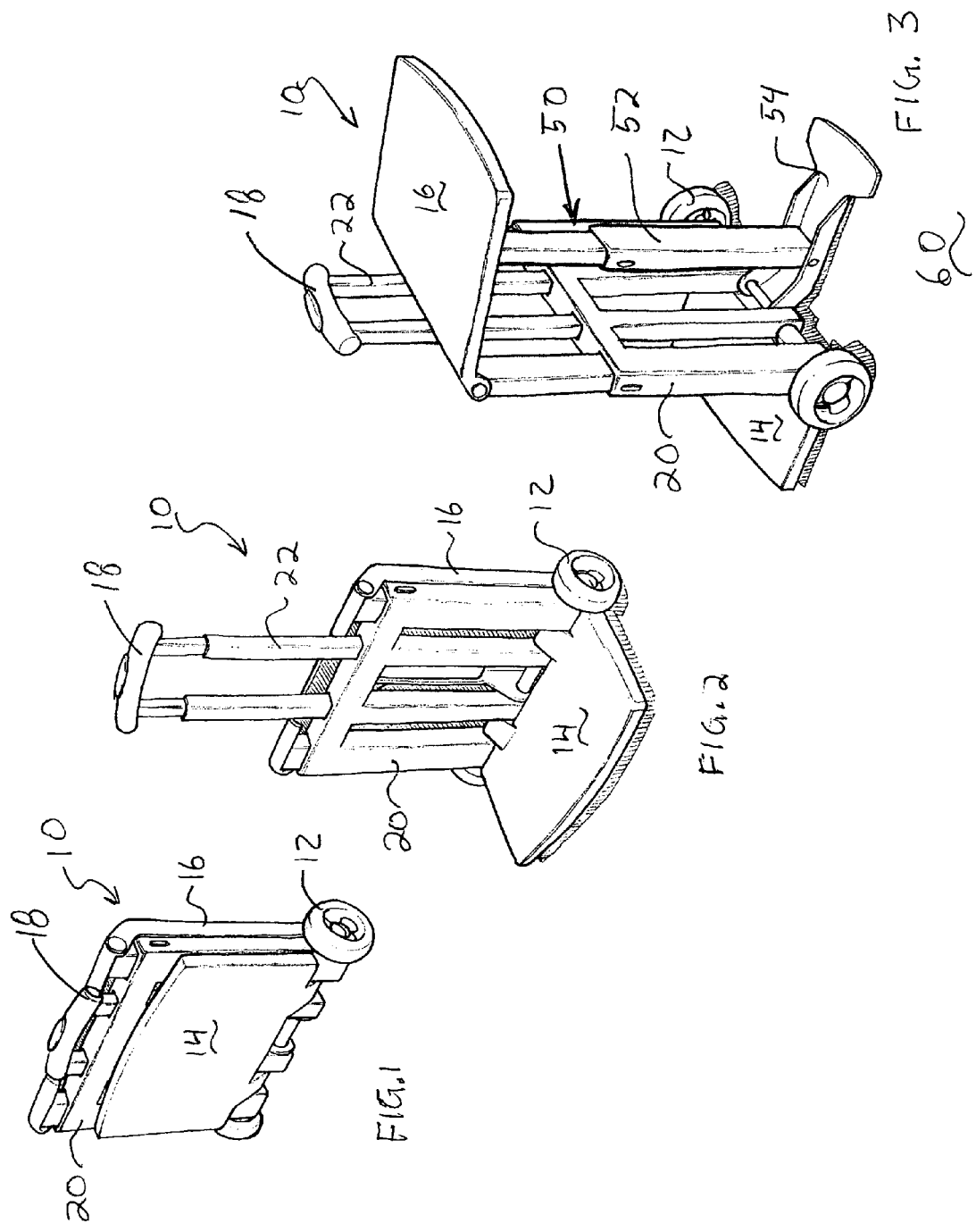

WHEELED TRANSPORTING DEVICE WITH TELESCOPING LEG STABILIZATION ASSEMBLY

CROSS REFERENCE TO RELATED APPLICATIONS

This patent application is a continuation of U.S. patent application Ser. No. 10/986,239, filed on Nov. 11, 2004 now abandoned. U.S. patent application Ser. No. 10/986,239 claims priority from U.S. Provisional Applications Ser. Nos. 60/519,169 filed Nov. 11, 2003, 60/600,743 filed Aug. 11, 2004, and 60/626,703 filed Nov. 10, 2004. U.S. patent application Ser. No. 10/986,239, U.S. Provisional Applications Ser. Nos. 60/519,169, 60/600,743, and 60/626,703 are incorporated herein by reference.

BACKGROUND OF THE INVENTION

1. Field of the Invention

This invention pertains to wheeled transport systems, and more particularly, but not by way of limitation, to a wheeled transport system incorporating at least one pivotally mounted, telescoping leg and foot assembly in conjunction with a pivotal work surface for the stabilization thereof.

2. History of the Related Art

Lap top computers and similar devices have been developed to enable business travelers to perform other work tasks while traveling. Despite their convenience, they are not truly comfortable to use on one's lap. In an airplane, this discomfort may be alleviated by the use of the folding tray tables with which aircraft seats are equipped. But in airport waiting rooms and hotel lobbies, where travelers necessarily spend a significant amount of time, there are no suitable work surfaces where lap top computers may be placed and used.

U.S. Pat. No. 6,543,796B1, incorporated herein by reference, provides a substantial improvement over previous designs. A luggage carrier, as described therein, includes a work surface pivotally extendable from a frame. The work surface is supported at one end by the frame and at the opposite end by one or more telescopic legs.

U.S. Provisional Patent Application Ser. No. 60/519,169 entitled "Wheeled Transporting Device," herein incorporated by reference, provides yet additional improvements over previous designs. A luggage carrier, as described therein, includes a work surface pivotally extendible from a frame, with the frame stabilized by an extendible leg.

BRIEF SUMMARY OF THE INVENTION

The present invention relates to wheeled transporting devices. More particularly, one embodiment includes a combined desk and article carrier assembly adapted for multiple modes of operation. One embodiment includes three modes, comprising a first collapsed mode for both storage and mobility, a second, semi-collapsed mode for transporting at least one article and for serving as a work desk in an expanded third mode. The assembly comprises a frame having upper and lower ends, the lower end having wheels and the upper end of the frame, including a handle upwardly telescopic relative thereto for facilitating the mobility of the frame on the wheels thereof. An article support shelf is pivotally connected to a first side of the frame near the lower end thereof and adapted to pivot outwardly and downwardly away from the frame to a generally horizontal position for supporting at least one article placed thereon in the second mode. A desk-top shelf pivotally is connected to a second, opposite side of the frame near a top end thereof and adapted to pivot outwardly and upwardly to a generally horizontal position to form a work desk in the third mode. Finally, a deployable foot support is pivotally connected to, and adapted to deploy outwardly from the second side of the frame near a bottom end thereof and pivotally connected to a telescoping strut attached to the desk-top shelf for providing support thereto in the third mode of operation.

In another embodiment, the apparatus described above further includes the telescoping strut being pivotally connected to an underside of the desk-top shelf. The telescoping strut and deployable foot are collapsible one beneath the other in the first collapsed mode, while the desk-top shelf is upwardly telescopic relative to the frame.

In another embodiment of the present invention, there are only two modes of operation, with the article support shelf not being collapsible and the desk-top shelf being generally rectangular and pivotally connected to the frame adjacent one edge of the shelf. The deployable foot is pivotally connected to the telescoping strut in an intermediate region thereof which is disposed outwardly from the frame when the desktop shelf is in a generally horizontal position, and the deployable foot comprises a generally U-shaped channel having a flared end outwardly thereof for providing stability to the assembly in the expanded, third mode.

In yet another embodiment, various embodiments of the above-described apparatus includes the telescoping strut being pivotally connected to the deployable foot within the generally U-shaped channel, the generally U-shaped channel being adapted for collapsing around the telescoping strut in the final collapsed mode.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 1 is a perspective view of one embodiment of the present invention illustrating a collapsed, portable configuration thereof;

FIG. 2 is a perspective view of the embodiment of the invention of FIG. 1 illustrating the extension of a handle portion and the outward extension of a luggage support shelf folded outwardly and downwardly to provide support for items placed on the shelf;

FIG. 3 is a perspective view of the fully expanded condition of the embodiment of the invention of FIG. 1 illustrating both the lower support shelf and upper work surface supported by a pivotally mounted, telescoping leg and foot assembly for the stabilization thereof.

DETAILED DESCRIPTION OF THE INVENTION

Figure 4A:
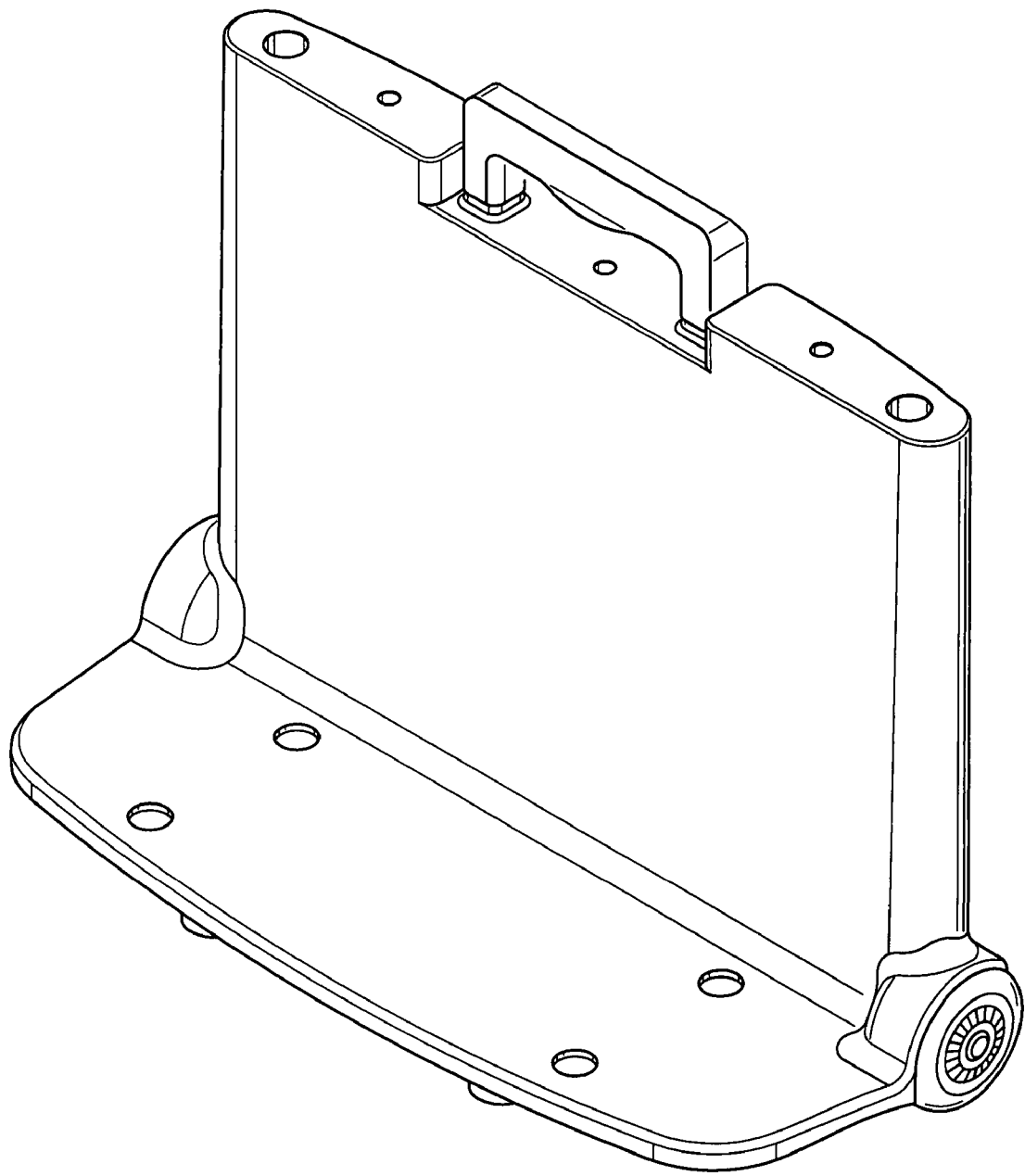
FIGS. 4A and 4B are perspective views of another embodiment for dual mode operation. two mode embodiment.

Referring now to FIGS. 1-3, an article carrier 10 in accordance with an aspect of the present invention is illustrated. The carrier 10 includes wheels 12 for ease of transport and a support shelf 14 for receiving luggage or the like. As shown in the compact position, the carrier 10 also includes a work surface 16 and a handle 18 that are joined to a frame 20. As shown in FIG. 3, the handle 18 may be extended for transport purposes. The handle 18 extends via telescopic arms 22 that connect to the frame 20. Also, the work surface 16 may pivot outwardly for use as a tray. The work surface 16 is capable of supporting a lap top computer, books, note pads, and various other items.

Referring now to FIG. 2, the carrier 10 may be used with luggage, computers, printers, tool boxes and the like. The carrier 10 is particularly adapted for schools, offices and in some cases, outdoor areas such as military use.

Referring now to FIG. 3, the carrier 10 includes a pivotally mounted, telescoping leg and foot assembly 50 for stabilizing the work surface 16 in accordance with an embodiment of the present invention. The work surface 16 is shown in an elevated position in conjunction with pivotally mounted, telescopic leg and foot assembly 50. A telescopic leg 52 is pivotally connected at its upper end to the underside of the work surface 16. At its lower end, leg 52 is pivotally connected to a support foot 54. The foot 54 is pivotally connected to the frame 20 to allow collapse and easy storage of the stabilizer leg 52 when not in use. The leg 52 may include a plurality of telescoping sections, such as four.

Figure 4B:
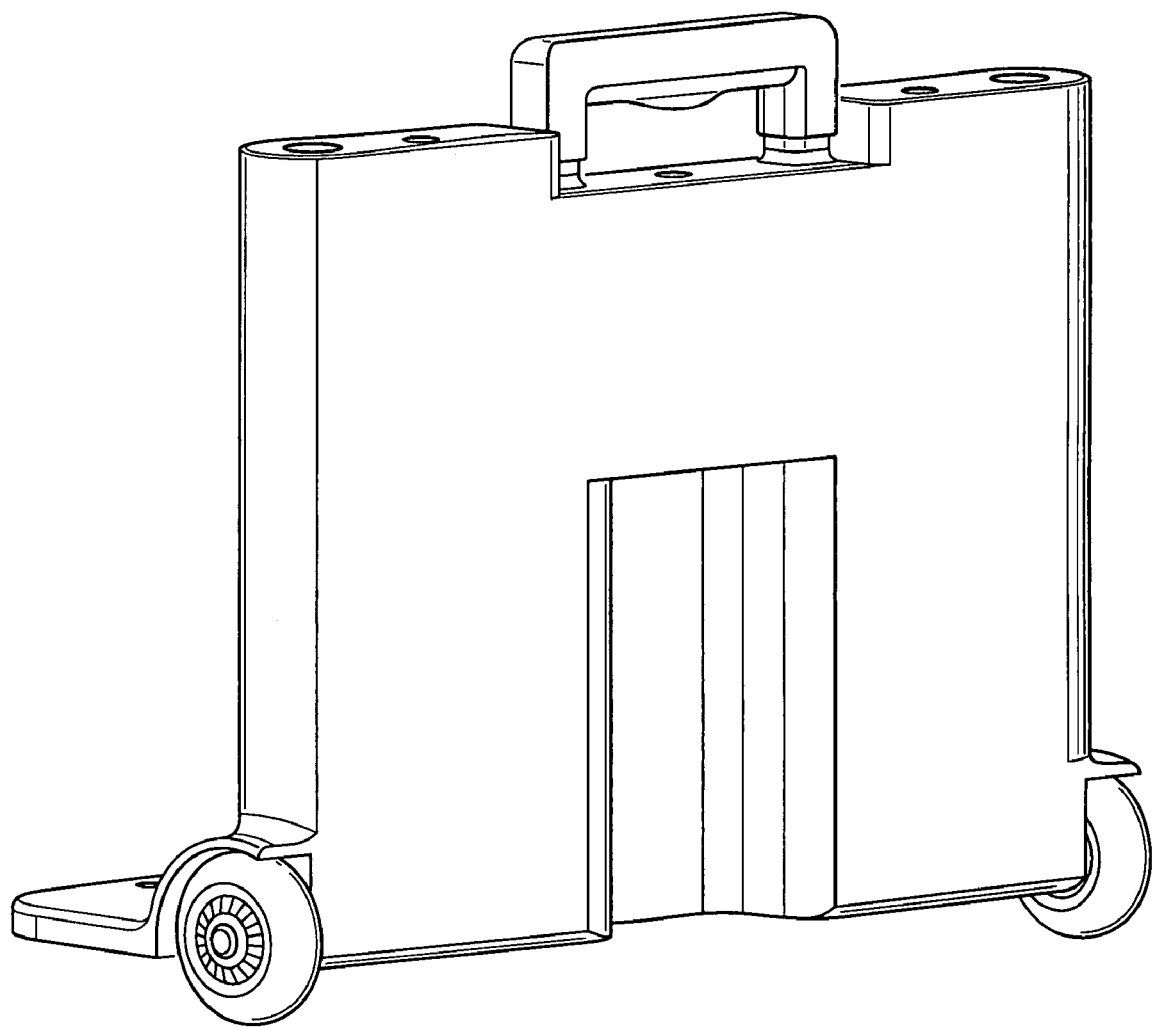

Referring still to FIG. 3, the carrier 10 is illustrated with the leg and foot assembly 50 in a position to stabilize the carrier 10 upon a floor surface 60. The support foot 54 also acts as a balancing member for preventing the carrier 10 from tipping over onto the user when the work surface 16 is loaded with heavy items. FIGS. 4A and 4B illustrate a two mode carrier 10 where the support shelf 14 does not pivot or collapse. A recess for the extendable leg and collapsible foot may be seen in FIG. 4B, which has the extendable leg and foot (not shown). Also not shown is the extendible desk-top shelf.

In summary, there are, in certain embodiments described above, three modes of operation, including a first collapsed mode for both storage and mobility, a second, semi-collapsed mode for transporting at least one article and for serving as a work desk in an expanded third mode. As shown herein, the assembly comprises a frame having upper and lower ends, the lower end having wheels and the upper end of the frame, including a handle upwardly telescopical relative thereto for facilitating the mobility of the frame on the wheels thereof. An article support shelf is pivotally connected to a first side of the frame near the lower end thereof and adapted to pivot outwardly and downwardly away from the frame to a generally horizontal position for supporting at least one article placed thereon in the second mode. A desk-top shelf pivotally is connected to a second, opposite side of the frame near a top end thereof and adapted to pivot outwardly and upwardly to a generally horizontal position to form a work desk in the third mode. Finally, a deployable foot support is pivotally connected to, and adapted to deploy outwardly from the second side of the frame near a bottom end thereof and pivotally connected to a telescoping strut attached to the desk-top shelf for providing support thereto in the third mode of operation.

In another embodiment, the apparatus described above further includes the telescoping strut being pivotally connected to an underside of the desk-top shelf. The telescoping strut and deployable foot are collapsible one beneath the other in the first collapsed mode, while the desk-top shelf is upwardly telescopical relative to the frame.

In another embodiment of the apparatus described above, the desk-top shelf is generally rectangular and is pivotally connected to the frame adjacent one edge of the shelf. The deployable foot is pivotally connected to the telescoping strut in an intermediate region thereof which is disposed outwardly from the frame when the desk-top shelf is in a generally horizontal position, and the deployable foot comprises a generally U-shaped channel having a flared end outwardly thereof for providing stability to the assembly in the expanded, third mode. Other shapes, including a flat surface, are also contemplated.

In yet another embodiment, the above-described apparatus includes the telescoping strut being pivotally connected to the deployable foot within the generally U-shaped channel, the generally U-shaped channel being adapted for collapsing around the telescoping strut in the final collapsed mode. In one embodiment, the carrier 10 has only two modes of operation in that the article support shelf 14 does not pivot or collapse. These aspects are shown in FIGS. 4A and 4B.

The previous description is of a preferred embodiment for implementing the invention, and the scope of the invention should not necessarily be limited by this description. The scope of the present invention is instead defined by the following claims.

What is claimed is:

1. A combined desk and article carrier assembly adapted for three modes of operation, including a first collapsed mode for both storage and mobility, a second semi-collapsed mode for transporting at least one article and for serving as a work desk in an expanded, third mode, the assembly comprising:
   a frame having upper and lower ends, the lower end having wheels and the upper end of the frame, including a handle upwardly telescopical relative thereto for facilitating the mobility of the frame on the wheels thereof;
   an article support shelf pivotally connected to a first side of the frame near the lower end thereof and adapted to pivot outwardly and downwardly away from the first side of the frame to a generally horizontal position for supporting at least one article placed thereon in the second mode;
   a desk-top shelf pivotally connected to a second, opposite side of the frame near a top end thereof and adapted to pivot outwardly and upwardly to a generally horizontal position to form a work desk in the third mode; and
   a deployable foot support pivotally connected to, and adapted to deploy outwardly from, the second side of the frame near a bottom end thereof and pivotally connected to a telescoping strut attached to the desk-top shelf for providing support thereto in the third mode of operation.

2. The apparatus in accordance with claim 1 in which the telescoping strut is pivotally connected to an underside of the desk-top shelf.

3. The apparatus in accordance with claim 2 in which the telescoping strut and the deployable foot are collapsible one beneath the other in the first collapsed mode.

4. The apparatus in accordance with claim 1 wherein the desk-top shelf is upwardly telescopical relative to the frame.

5. The apparatus in accordance with claim 4 in which the desk-top shelf is generally rectangular and is pivotally connected to the frame adjacent one edge of the shelf.

6. The apparatus in accordance with claim 1 in which deployable foot is pivotally connected to the telescoping strut in an intermediate region thereof which is disposed outwardly the frame when the desk-top shelf is in a generally horizontal position.

7. The apparatus in accordance with claim 6 in which the deployable foot comprises a generally U-shaped channel having a flared end outwardly thereof for providing stability to the assembly in the expanded, third mode.

8. The apparatus in accordance with claim 7 wherein the telescoping strut is pivotally connected to the deployable foot within the generally U-shaped channel, the generally U-shaped channel being adapted for collapsing around the telescoping strut in the first collapsed mode.

9. A combined desk and article carrier assembly adapted for transporting at least one article in one mode and for serving as a work desk in an another mode, the assembly comprising:

- a frame having upper and lower ends, the lower end having wheels and the upper end of the frame, including a handle upwardly telescopically relative thereto for facilitating the mobility of the frame on the wheels thereof;
- an article support shelf connected to a first side of the frame near the lower end thereof for supporting at least one article placed thereon;
- a desk-top shelf pivotally connected to a second, opposite side of the frame near a top end thereof and adapted to pivot outwardly and upwardly to a generally horizontal position to form a work desk; and
- a deployable foot support pivotally connected to, and adapted to deploy outwardly from, the second side of the frame near a bottom end thereof and pivotally connected to a telescoping strut attached to the desk-top shelf for providing support thereto.

\* \* \* \* \*